May 17, 1927.
P. A. STOVER
1,629,232
REAR SIGNAL LIGHT FOR AUTOMOBILES
Filed Sept. 8, 1923
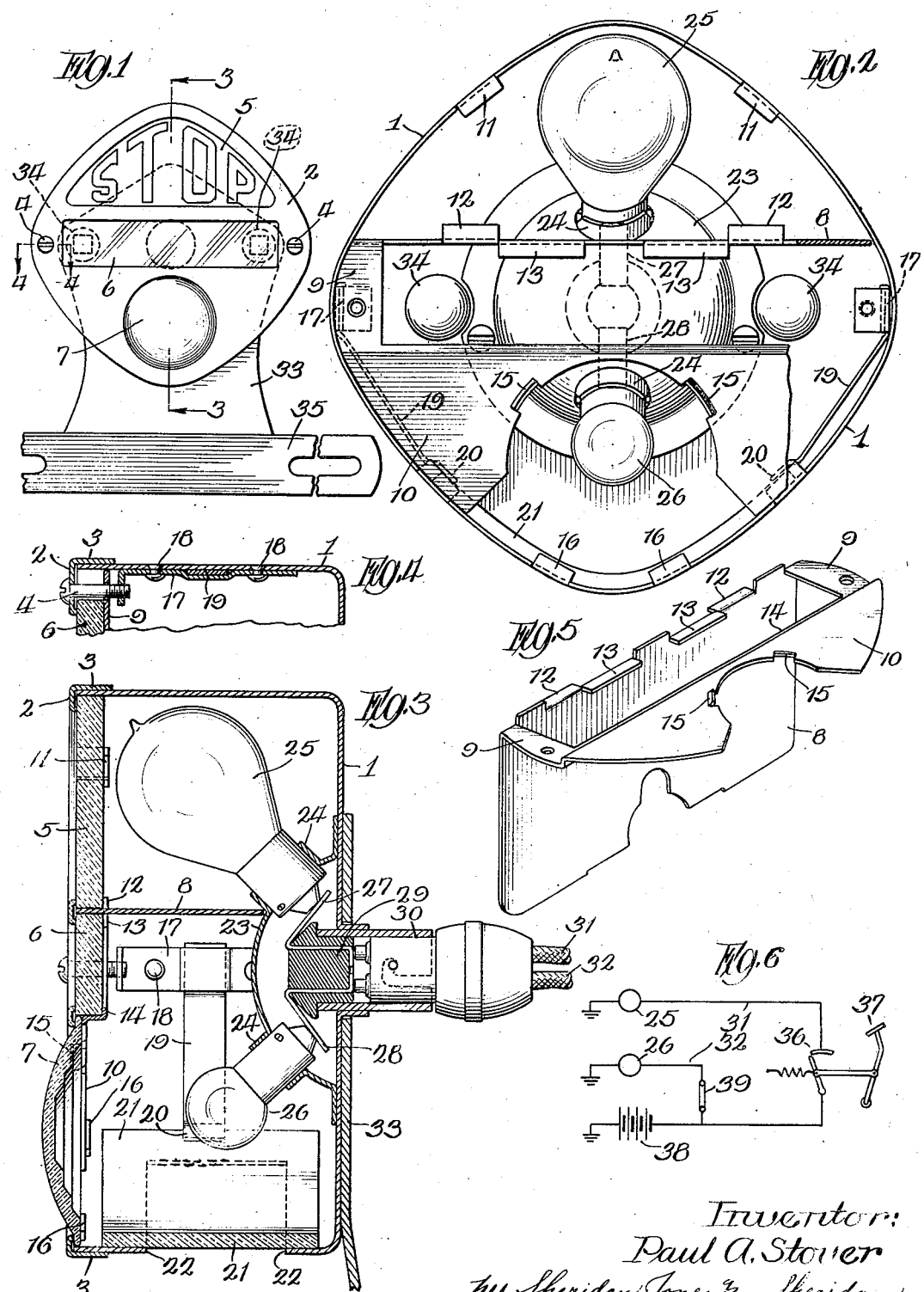
Inventor:
Paul A. Stover
by Sheridan, Jones and Sheridan
Atty's.

Patented May 17, 1927.

1,629,232

UNITED STATES PATENT OFFICE.

PAUL A. STOVER, OF RACINE, WISCONSIN, ASSIGNOR TO THE STOVER SIGNAL ENGINEERING COMPANY, OF RACINE, WISCONSIN, A CORPORATION OF DELAWARE.

REAR SIGNAL LIGHT FOR AUTOMOBILES.

Application filed September 8, 1923. Serial No. 661,568.

My invention relates to improvements in rear signal lights for automobiles. More specifically it relates to an improved combination tail lamp and danger signal comprising a lamp structure having a red light or other distinctly colored light constantly visible from the rear of the vehicle, and a lamp illuminated intermittently to indicate a change of speed, such as a slowing down or stopping of the machine.

The signal lamp disclosed herein is intended as an improvement over the lamp shown in my co-pending application 629,765, filed April 4, 1923.

The objects of the present invention are to provide a signal lamp of this character having certain structural improvements over my prior structure whereby the parts may be manufactured more economically and the lamp assembled more rapidly. Another object is to provide an improved support for the two signal lamps whereby a single electrical attachment plug may be used in connecting the lamps with the battery circuit, instead of the two attachment plugs previously used. Other objects will be apparent from the description hereinafter given of the preferred embodiment of the invention.

Figure 1 is a rear elevation of the signal lamp.

Fig. 2 is an enlarged rear elevation thereof with the rear wall or cover removed.

Fig. 3 is a central sectional elevation on line 3—3, Fig. 1.

Fig. 4 is a fragmentary section on line 4—4, Fig. 1.

Fig. 5 is a perspective view of the removable partition, and

Fig. 6 is a circuit diagram.

The body of the structure or casing is made preferably from a single sheet of metal 1 drawn to cup-shaped form and provided with a rear wall or cover 2 having flanges 3. Said cover is held in place by suitable fastening means, such as a pair of screws 4; said cover has a plurality of openings therein, preferably three, in the upper of which is a glass panel 5 having the word "Stop" formed therein constituting a stop signal. The middle panel 6 is intended to display the name of the car or owner, or some design or other insignia, such as the trade-mark of the automobile manufacturer; the name of a city, the initials or monogram of the owner, or the symbol of some club or other organization. The lower glass panel 7 is preferably in the form of a lens of red, yellow or green glass constituting a warning signal.

The interior of the structure is divided into an upper and lower compartment by means of a partition 8, shown in perspective in Fig. 5. Said partition is made preferably by stamping it from sheet metal; the upper portion thereof is bent into a plane at right angles to the main dividing wall, but has a long rectangular opening cut therefrom leaving end strips 9 beyond which is a sheet metal extension 10 struck up from the plane on the members 9. Sheet metal lugs 11 are struck out of the side wall of the housing and bent over, as shown in Figures 2 and 3, to support the glass panel 5 with its surface substantially flush with the rear edge of the housing. Said panel is also supported on lugs 12 bent at right angles to the dividing partition 8, additional lugs 13 being bent in the opposite direction and serving to support the central panel 6; said panel also resting on the ledge 14 and on the end members 9. Said central panel is not quite as long as the distance between the two screws 4, the latter serving to position said panel longitudinally. Additional lugs 15 are struck from the sheet metal extension 10 and serve to position the panel 7, the latter resting also on lugs 16.

The three panels when assembled on their respective supports fit snugly within the casing. The parts are preferably so proportioned that in assembling them it is necessary to spring the opposite side walls of the casing in towards each other a little so that the three panels may be conveniently dropped into place, after which the resiliency of said side walls causes them to be held with a fairly firm frictional grip so that there is little danger of rattling. After the cover 2 has been put in place and the screws 4 tightened the three panels are held securely against movement in any direction.

It will be noted that the central partition 8 is simply slipped into place, the ends 9 being confined frictionally within the side walls of the housing and positively held against movement by the same screws 4 which also hold the cover in place. With this arrangement the structure may be very readily assembled, the parts being held in place by two screws only, and on the other hand access to the interior may be readily had by simply removing the two screws and removing the glass panels and also pulling out the middle partition, if desired.

At the opposite sides of the casing, a pair of sheet metal strips 17 are located, being held in place by rivets 18 or other suitable means. The outer ends of said strips are bent over and screw-threaded to receive screws 4, as shown in Fig. 4. The middle part of each strip is struck up to receive a further sheet metal strip 19, the end of which is offset to form a clip 20, as shown in Fig. 2. These clips 20 serve to position a curved glass panel 21 which closes an opening 22 in the bottom of the casing. This glass panel permits the license plate to be illuminated by the light from the interior of the casing.

Within said casing is a substantially hemispherical sheet metal support 23 having struck up portions 24 constituting a pair of lamp sockets which receive incandescent lamps 25 and 26, as shown in Figures 2 and 3; said sheet metal support 23 also constitutes a common terminal for the two lamps and being permanently secured to the casing 1, as by spot welding, for example, providing a grounded connection. The center contacts for the two lamps are furnished by resilient metal strips 27 and 28 which are molded into suitable insulating material 29, preferably bakalite, and supported in a cylindrical member 30 projecting from the front of casing 1 constituting a socket for an attachment plug. Any suitable attachment plug may be used to connect the lamps with the battery circuit through conductors 31 and 32, as shown in Fig. 3.

The lamp structure as a whole has secured to the front side thereof a stiff metal plate 33 from which project bolts 34 whereby the lamp structure may be supported on a suitable bracket on the rear part of an automobile. At the lower end of the plate 33 is the license bracket 35 the license plate (not shown) being arranged beneath the lamp in such position that it may be illuminated by the incandescent lamp 26.

In the circuit diagram in Fig. 6, a switch 36 is shown operated by the brake-pedal 37 or other suitable means whereby the circuit of lamp 25 is closed intermittently whenever the car slows down. Said switch completes the circuit to the battery 38, the lamp 26 being also connected to said battery through a suitable switch 39 which may remain closed for long intervals of time.

As previously pointed out the construction described permits rapid assembly and economical manufacture of the parts, most of which are sheet metal stampings. Furthermore, only a single attachment plug is required to close the circuit of the two lamps.

What I claim as new is:

1. A vehicle signal lamp comprising a housing formed with a base portion, an unsecured partition removably inserted in said housing and dividing said housing into two compartments, said partition being provided with an angularly disposed portion overlying one of said compartments, said overlying portion being apertured to accommodate translucent panels, a cover for said housing apertured to align with the apertures in said overlying portion of said partition, translucent panels located between the apertures in said overlying portion and the corresponding apertures in said cover.

2. A vehicle signal lamp comprising a housing, a single supporting means therein being provided with two lamp sockets, a lamp mounted in each of said sockets, contacts carried by said casing in position contactable by said lamps, said lamps being movable with said supporting means into and out of contact with said contacts, a partition located between said lamps and freely insertable in and removable from said housing, and a removable cover for said housing co-acting with said partition to divide said housing into a pair of compartments each containing one of said lamps.

3. A device of the class described, comprising a housing, a cover therefor having three openings therein, an unsecured partition within said housing having an extension arranged at right angles to said partition and substantially parallel to said cover but spaced therefrom, and a translucent panel for each of said openings arranged beneath said cover and removable without disturbance of said lamps, said partition and extension being provided with means to contact and support a pair of said panels, said extension being apertured to coincide with one of said openings.

4. A signal lamp comprising a sheet metal casing having a base and side walls, said walls being curved to form angles on opposite sides of said casing, a removable partition member fitting within said casing and having a right angular extension, said extension being gripped by said opposite curved walls to be retained in place by friction, and a cover for said casing.

5. In a device of the class described, a housing having projections arranged on the inner walls thereof, a removable cover for said housing, fastening means passing through said cover into said angular projections, a partition within said housing having an end bent at right angles and spaced from said cover, and a translucent panel supported between said end and said cover and confined between said fastening means.

6. A device of the class described, comprising a housing, having an opening, metal strips secured to opposite walls thereof, angularly disposed strips terminating near said opening in said housing, a transparent panel closing said opening and held by said angularly disposed strips, and a cover having means for securing it to said first named strips, said first and second named strips being secured to said housing by a common means.

7. A signal lamp comprising a cup shaped sheet metal housing, a removable cover therefor, a partition located in said housing to divide the same into two compartments, said partition being provided with angularly disposed lugs and an oppositely directed angularly disposed extension, said extension being apertured, three translucent panels, means including said lugs and said cover holding one of said panels in position, said lamp including means holding another of said panels over the aperture in said angular extension and means including the angular extension to hold the third of said panels between said extension and said cover.

8. A vehicle signal lamp comprising a casing having a base, said base having an opening therein, a convex metal shell secured to said base and overlying said opening, incandescent lamps mounted in said shell, a partition removably inserted between said lamps and extending between the sides of said casing to divide the same into a pair of compartments, said partition extending outwardly from said base and being recessed to conform to the exterior of said metal shell, and a cover for said housing.

9. A vehicle signal lamp comprising a metal housing having an aperture in one wall thereof, a concave supporting member secured to said wall around said aperture and having a plurality of lamp receiving openings, insulated contact members projecting through said aperture and into the concavity of said support into contactable position with relation to lamps carried in said openings in said supporting member.

10. A vehicle lamp comprising a sheet metal housing having an aperture in one wall thereof, a supporting member secured to said wall around said aperture, said supporting member being provided with a pair of spaced apertures surrounded by sleeve portions to provide sockets for lamps, a plug member extending through the aperture in said housing and provided with a pair of insulated spring contacts located in contactable position with relation to lamps inserted in said sockets.

11. A vehicle lamp comprising a sheet metal housing having an aperture in one wall thereof, a supporting member secured to said wall around said aperture, said supporting member being provided with a pair of spaced apertures surrounded by sleeve portions to provide sockets for lamps, a plug member extending through the aperture in said housing and provided with a pair of insulated spring contacts located in contactable position with respect to lamps inserted in said sockets, a sleeve carrying said plug projecting outwardly of said housing to form a socket for a connector.

12. A vehicle signal lamp comprising a sheet metal housing with an aperture in one wall thereof, a supporting member of convex exterior, secured to the inner side of said wall around and over said aperture, said member being provided with a pair of spaced, divergently arranged, lamp receiving sockets and means, carrying insulated contacts, projecting through said aperture in the wall of said housing to lie beneath said lamp receiving sockets.

13. A vehicle lamp comprising a metal housing having a back wall with an aperture therein, a lamp supporting member having a plurality of lamp receiving openings therein, means for removably securing said supporting member to said wall over said aperture, said member and housing being so shaped as to form a space with which the lamp receiving openings communicate, contact members extending through said aperture into said space, each having a contact portion adjacent a corresponding lamp receiving opening and means for supporting said contact members on and insulating them from said housing.

14. A vehicle signal lamp comprising a sheet metal housing open at one side and having an aperture in the bottom thereof, a cover for said open side and a translucent cover for said aperture in the bottom, spring strips having free ends yieldingly engageable with said transparent cover to hold the same in position, angularly disposed fastening strips, said fastening strips and said spring strip being secured to said housing by common fastening means, and means to secure said first named cover to said fastening strips.

In testimony whereof, I have subscribed my name.

PAUL A. STOVER.

CERTIFICATE OF CORRECTION.

Patent No. 1,629,232. Granted May 17, 1927, to

PAUL A. STOVER.

It is hereby certified that error appears in the printed specification of the above numbered patent requiring correction as follows: Page 2, line 128, claim 5, before the word "partition" insert the word "removable"; and that the said Letters Patent should be read with this correction therein that the same may conform to the record of the case in the Patent Office.

Signed and sealed this 14th day of June, A. D. 1927.

Seal.

M. J. Moore,
Acting Commissioner of Patents.